United States Patent [19]
Lavin et al.

[11] Patent Number: 5,289,045
[45] Date of Patent: Feb. 22, 1994

[54] UNINTERRUPTIBLE POWER SUPPLY

[75] Inventors: James V. Lavin, Newbury Park; Loy L. Spears, Placentia; Neil S. Symonds, Agoura, all of Calif.

[73] Assignee: National CSF Corporation, Newbury Park, Calif.

[21] Appl. No.: 34,657

[22] Filed: Mar. 22, 1993

Related U.S. Application Data

[63] Continuation of Ser. No. 435,197, Nov. 13, 1989, abandoned.

[51] Int. Cl.⁵ ................................................ H02J 9/06
[52] U.S. Cl. .................................. 307/64; 307/66; 307/48
[58] Field of Search ................ 307/64, 65, 66, 47, 307/48

[56] References Cited

U.S. PATENT DOCUMENTS

| | | | |
|---|---|---|---|
| 3,771,012 | 11/1973 | Niederjohn | 307/64 |
| 3,873,846 | 3/1975 | Morio et al. | 307/23 |
| 4,395,639 | 7/1983 | Bring | 307/66 |
| 4,506,323 | 3/1985 | Pusic et al. | 364/200 |
| 4,510,400 | 4/1985 | Kiteley | 307/66 |
| 4,510,401 | 4/1985 | Legoult | 307/66 |
| 4,564,767 | 1/1986 | Charych | 307/66 |
| 4,623,960 | 11/1986 | Eng | 363/21 |
| 4,672,228 | 6/1987 | Swoboda | 307/66 |
| 4,672,293 | 6/1987 | Crampton | 307/66 |
| 4,673,825 | 6/1987 | Raddi et al. | 307/66 |
| 4,729,083 | 3/1988 | Kyriakos | 307/66 |
| 4,745,299 | 5/1988 | Eng et al. | 307/66 |
| 4,860,185 | 8/1989 | Brewer et al. | 307/66 |
| 4,885,521 | 12/1989 | Crampton | 307/66 |

FOREIGN PATENT DOCUMENTS

2577079 8/1986 France .
2120474 11/1983 United Kingdom .

Primary Examiner—Jeffrey A. Gaffin
Attorney, Agent, or Firm—Gregory L. Roth

[57] ABSTRACT

An uninterruptible power supply provides internal connection to an auxiliary power to provide continuous device power without duplicating regulation and switching circuits. The power supply includes an AC to DC converter, a transformer and a switch applying DC power from converter to the transformer. A pulse width modulation control circuit assures a regulated output voltage while application of auxiliary power is controlled by a fixed time interval one-shot that assures a smooth transition to AC utility power upon resumption of such power following a failure. An auxiliary AC power output signal is maintained for a video monitor or other device even while operating on auxiliary power.

19 Claims, 4 Drawing Sheets

UNINTERRUPTIBLE POWER SUPPLY

This is continuation of U.S. Ser. No. 07/435,197, filed Nov. 13, 1989, now abandoned.

BACKGROUND OF THE INVENTION

Uninterruptible power supplies are required for many computer installations such as network file servers, telecommunications equipment or other applications where a sudden loss of power would create an unacceptable and costly occurrence. For example, there may be situations where data would be lost or corrupted if power were lost during a data transfer or perhaps the cost of a business shutdown simply because of the unavailability of a computer would be sufficient to justify the additional cost for an uninterruptible power supply. Thus, for various reasons there are numerous applications where an uninterruptible power supply is required and the numbers of these applications would each increase substantially if the cost were reduced.

Presently available uninterruptible power supplies are placed between the standard AC utility outlet and the AC utility plug for the computer or other electrical device which must receive continuous electrical power. The power supply includes a battery providing electrical energy in the event of a power failure, an AC to DC converter and an inverter converting electrical energy back from DC to AC. The standard device power supply then receives the AC input from the uninterruptible power supply and in turn converts this to the various required regulated and unregulated voltages required for the system. The AC to DC converter of the conventional uninterruptible power supply converts the AC power to DC power at approximately the battery voltage with a trickle charge being available to assure that the battery remains charged at all times. Typically the battery is a lead acid battery. The inverter then reconverts the DC energy from the DC battery voltage back to an AC power supply approximating standard utility AC power. In the event of a power failure, the internal DC voltage from the AC to DC converter drops below the battery output voltage. This causes the battery to begin supplying the DC power to the inverter in lieu of the AC to DC converter. The system proceeds with the battery supplying power until standard AC utility power is restored or the battery discharges.

While such arrangements work satisfactorily, they are relatively expensive and inefficient. Such systems must work at relatively high power levels of typically two hundred to three hundred watts and are typically only 75 to 80 percent efficient. Consequently, substantial amounts of power must be dissipated within the uninterruptible power supply. Large and expensive components are therefore required to dissipate the resulting heat. In addition, the AC to DC converter, the inverter, and corresponding control circuits must be duplicated within the conventional power supply within the computer or other electrical device. The customer must therefore in effect purchase two power supplies; a standard device power supply plus an uninterruptible power supply.

SUMMARY OF THE INVENTION

An automatic, uninterruptible power supply with internally connected auxiliary power source in accordance with the invention includes a connection to standard AC utility power, an AC to DC converter, a pulse width modulated switching circuit controlling a regulated output power signal, a transformer having a primary connected to the switching circuit, one or more secondary windings, and an auxiliary power source such as a battery coupled to provide the DC power in the event that the AC to DC converter is unable to provide DC power because of a utility power failure. Because the battery connects internally of the regulating power supply for the device being powered, the conventional AC to DC converter and the inverter need not be duplicated and the efficiency losses associated with the duplicate converters are eliminated. The internal power supply thus facilitates reduced cost, improved efficiency and reduced power dissipation.

A secondary inverter responsive to the internal DC power level may be employed and coupled through a relay to provide standby AC power for an auxiliary device such as a video monitor or a printer for a personal computer. A battery small enough to fit within a standard personal computer power supply can provide auxiliary power to run a typical personal computer for six to seven minutes. Longer auxiliary power intervals can be achieved by utilizing larger, external batteries with internal connection to the regulated power supply.

BRIEF DESCRIPTION OF THE DRAWINGS

A better understanding of the invention may be had from a consideration of the following detailed description, taken in conjunction with the accompanying drawings in which.

DETAILED DESCRIPTION OF THE INVENTION

Figure 1:
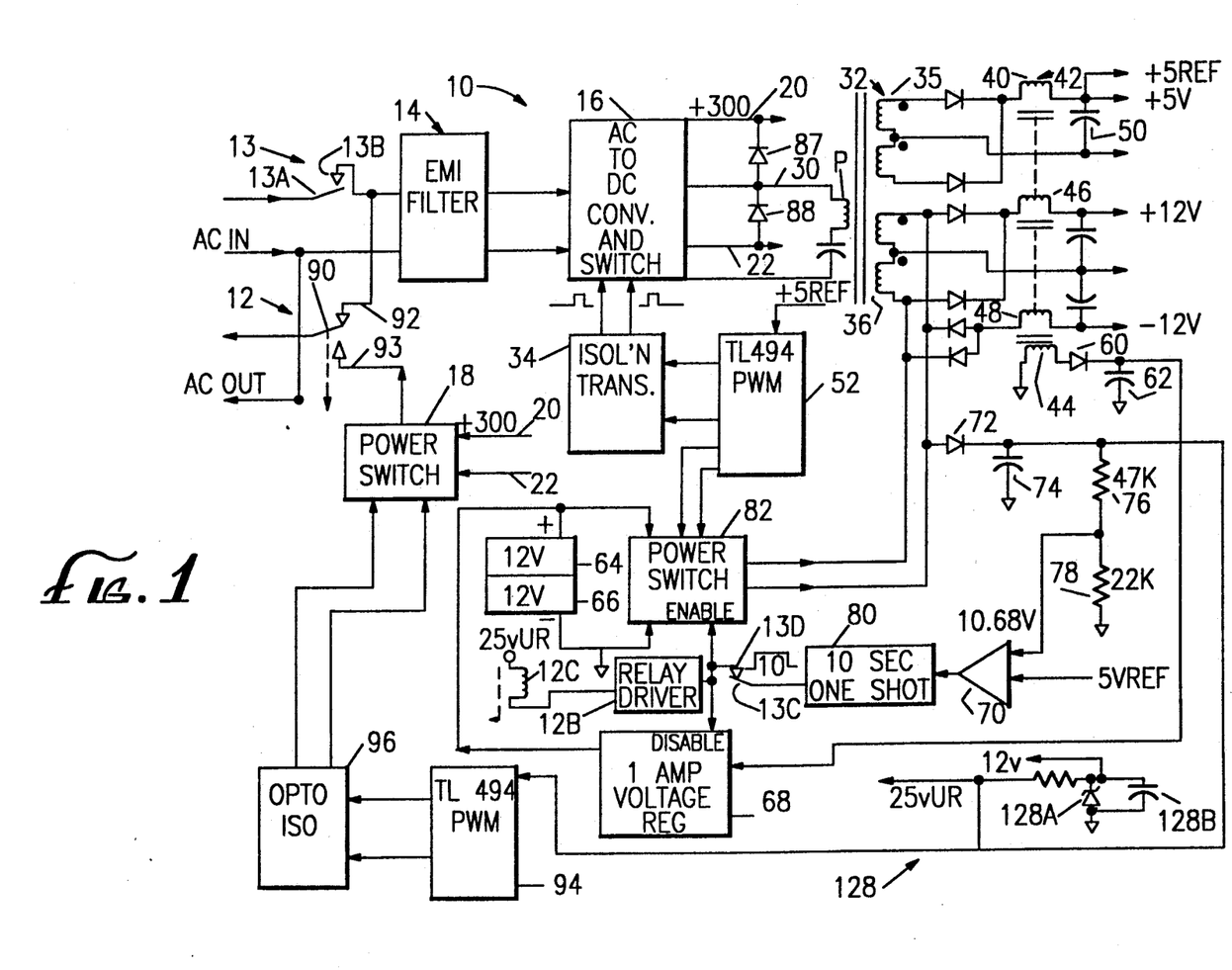
FIG. 1 is a schematic and block diagram representation of an uninterruptible regulating power supply with an internally connected battery in accordance with the invention.

Referring now to FIG. 1, an uninterruptible power supply (UPS) with internal reserve power source 10 includes a single pole double throw relay 12 having a coil 12C coupling standard AC utility power to an AC auxiliary output. The relay 12 is shown in its nonactuated state with the coil 12C connected between 25 volt unregulated power and relay driver 12B. Relay 12 connects the auxiliary AC output to the utility power supply. Relay 12 has a set of contacts 90, 92, 93 providing connection between the utility power supply and an AC output plug connector. The AC output plug connector makes AC power available for a peripheral device such as a video monitor or a printer. Upon loss of power the output of a 10 second one-shot circuit 80 activates to cause a relay driver 12B to activate relay coil 12C to cause the relay 12 to switch the contact 90 from AC input terminal 92 to an auxiliary power terminal 93 to energize the AC output connector from a power switch 18 which receives 300 volt DC power from an AC to DC converter and switch circuit 16. Power switch 18 selectively switches these voltages at 60 hertz to simulate a standard AC utility power line. The output signal is closer to a square wave than to a sine wave, but is adequate to drive a video monitor or printer.

A double pole, single throw main power switch 13 has a first terminal 13A shown closed against a contact 13B to conduct power from the AC input to an EMI filter 14. A second terminal 13C is shown closed against a contact 13D to communicate a control signal from a 10 second one-shot circuit 80 to enable inputs of a voltage regulator 68 and a power switch 82. Opening of main power switch 13 opens both the contacts 13B, 13C.

The AC to DC converter and switch circuit 16 receives AC power through EMI filter 14 and operates in a conventional fashion to full wave rectify the AC power and drive DC power rails 20, 22 with unreferenced 300 volts DC.

The switch portion of AC to DC converter and switch circuit 16 includes switching transistors which selectively and alternately couple primary winding terminal 30 of transformer 32 to the plus and minus DC voltage rails 20, 22 in response to pulse width modulated switching control signals from an isolation transformer circuit 34. The primary winding of transformer 32 is thus continually energized with pulse width modulated plus and minus 150 volt alternating power signals. As explained subsequently, the duty cycle of the pulse width modulation is selected to maintain a selected reference voltage at one of the outputs of the power supply 10.

Although additional secondary windings may be employed as desired, in the present instance the transformer 32 has two sets of center tapped secondary windings 35, 36 each arranged as a push-pull winding pair. The first set of secondary windings 35 is selectively wound to produce a 5 volt output while the second set of secondary windings 36 is wound to produce plus and minus 12 volt outputs.

The first set of secondary windings 35 are coupled through rectifying diodes to a winding 40 of a power distributing inductor 42 and then to the +5 volt regulated output. A filter capacitor 50 interconnects the +5 volt and common terminals of secondary winding 35. A signal +5 REF is taken from the +5 volt terminal and returned as a reference input to a TL 494 pulse width modulation control circuit 52. PWM circuit 52 is commercially available from Texas Instruments Corporation. This circuit provides all of the timing and control to provide pulse width modulated switching signals to maintain the 5 volt output of secondary winding 34 at a desired 5 volt reference level. The switching signals are coupled through the isolation transformer 34 and then back to the inverter portion of AC to DC converter and inverter 16 as previously explained.

Secondary winding 36 is coupled through rectifying diodes to an inductor winding 46 of inductor 42 to a +12 volt output and through rectifying diodes and winding 48 of inductor 42 to an opposite polarity −12 volt output. The inductor 42 is a conventional power distributing powdered permalloy core inductor which enables the regulated voltages to be maintained notwithstanding unequal current drains from the different regulated voltage outputs.

A winding 44 of inductor 42 has a number of turns selected to provide an approximately 30 volt charging voltage which is communicated through a rectifying diode 60 and a filter capacitor 62 which provides a connection to ground. The filtered charging voltage signal is communicated through a one amp current limiting voltage regulator 68 to the positive input terminal of the auxiliary power supply, which in this case is a pair of series connected 12 volt lead acid batteries 64, 66. The voltage regulator 68 is designed to provide a battery float voltage of approximately 27.4 volts. This voltage is sufficient to maintain a substantially full charge on the nominal 24 volt battery 64, 66 without inflicting overcharge damage upon the battery.

Under normal operating conditions, AC power input is received through main power switch 13 and passed through EMI filter 14 to AC to DC converter and switch circuit 16. Circuit 16 converts the AC input power to the 300 volt DC rail voltages which are applied to the primary winding P of transformer 32 with a duty cycle sufficient to maintain the +5 volt secondary output at a reference voltage of 5 volts. If the reference voltage drops slightly the pulse width modulator circuit 52 increases the duty cycle so as to increase the power through transformer 32 and maintain the proper output voltage. Similarly, if the +5 volt reference should increase slightly, the duty cycle is decreased until the +5 volt output signal returns to the +5 volt reference level. The turns ratio between secondary windings 35, 36 and the primary winding P of transformer 32 assures that the secondary windings 36 provide the proper plus and minus 12 volt outputs when the +5 volt output is maintained at its reference voltage. At the same time, winding 44 of power balancing inductor 42 provides a trickle charge signal which assures that the batteries 64, 66 remain fully charged and ready for standby operation.

An internal power supply circuit receives half wave rectified power from diode 72, which sources the low voltage detector, and provides power to various locations within power supply circuit 10. A direct tap-off provides an essentially unregulated voltage 25 VUR while a zener diode 128A and filter capacitor 128B provide a regulated 12 volt supply for low power usage.

In the event of a failure in the AC utility power supply, the energy stored by DC power rails 20, 22 quickly dissipates, the voltage output of secondary winding 36 begins to drop along with that of secondary winding 35 and this drop is detected by a comparator 70 coupled thereto.

Comparator 70 has one input coupled to a +5 volt reference voltage and a second input coupled through a voltage divider off a tap from secondary winding 36 which passes through a diode 72, a filter capacitor 74 and a pair of voltage divider resistors 76, 78 of 47K and 22K ohms respectively. The voltage divider circuit causes the output of comparator 70 to be actuated when the nominal 25 volt output of diode 72 drops below 15.68 volts. The filter capacitor 74 has a value of 10 uf in the preferred example and is selected to maintain the output of diode 72 above 15.68 volts under normal operating conditions, but to quickly discharge and reduce the output of diode 72 below 15.68 volts rapidly after a termination of input power. Capacitor 74 is sufficiently small to permit the power loss to be detected before the 5 volt and 12 volt regulated outputs drop below specification requirements, which are typically plus or minus five percent.

When the input to comparator 70 from diode 72 drops below 5 volts to indicate a power failure, the output of comparator 70 goes high to trigger a 10 second one-shot multi vibrator circuit 80. Upon being actuated, one-shot 80 sets and maintains an output signal for a fixed time of approximately 10 seconds. This output signal is coupled as an enable input to a power switch 82 and as a disable input to the battery recharging voltage regulator 68. Since there is some loss of efficiency in the battery charging circuit, there is no point in using the battery to recharge itself.

When enabled by one-shot 80, power switch 82 operates in response to the pulse width control signals from pulse width modulator circuit 52 to alternatingly drive opposite sides of 12 volt secondary winding 36 of transformer 32 with the nominal 24 volt auxiliary power from batteries 64, 66. The power supplied to secondary winding 36 of transformer 32 from batteries 64, 66 is reflected through transformer 32 to the other secondary winding 34 and through the transformer primary back through rectifying diodes 87, 88 to the plus and minus DC voltage power rails 20, 22.

The second pole 13C, 13D of main power switch 13 serves to prevent one-shot 80 from automatically commanding auxiliary power when main power switch 13 is turned off. Without the second pole 13C, 13D, the comparator 70 would sense the loss of power the same as for a power failure and cause the one-shot output signal to command use of auxiliary power.

Duplication of circuitry is avoided by using the same pulse width modulator circuit 52 to regulate the secondary winding voltages during both battery operation and normal AC utility power operation. Furthermore, by driving the secondary winding 36 under battery power the use of additional windings or even additional transformers to couple the battery power into the regulated voltage windings is avoided. The uninterruptible feature of the power supply is thus provided by internal connection to a regulating AC source power supply without unnecessary additional cost or loss of power efficiency.

One of the problems associated with a power supply having internally connected auxiliary power is detection of a return of AC utility power. This is handled automatically by the comparator 70 and the 10 second one-shot circuit 80 in the present embodiment. As indicated previously, the 10 second one-shot 80 enables the power switch 82 to provide battery power to the secondary winding 36 for a period of 10 seconds. At the end of that time, if AC utility power has not been restored the energy stored by the filter capacitors of the AC to DC converter and switch 16 will begin to dissipate and the nominal 25 volt output voltage from diode 72 and capacitor 74 will begin to drop. As soon as this voltage drops below 15.68 volts the comparator 70 will again become actuated and will activate one-shot 80 for another 10 second time interval. A test is thus conducted for return of AC utility power every 10 seconds. If AC power returns, the control voltage will not drop when the 10 second signal from one-shot 80 terminates and standby power will be automatically discontinued. The 10 second cycles will thus continue indefinitely until either the batteries 64, 66 become discharged or AC power is returned.

The auxiliary power source for the uninterruptible power supply 10 is thus automatically internally connected upon loss of AC utility power and automatically disconnected upon restoration of the utility AC power. All of this occurs with no disruption of the regulated output voltages as these voltages are maintained within designed specification limits.

In addition to maintenance of the regulated DC output voltages, provision is made to maintain the auxiliary AC output signal for a video monitor or other device.

Upon detection of loss of utility AC power, the relay 12 is energized in response to the firing of one-shot circuit 80 so that relay arm 90 loses connection with terminal 92 to the AC power line and closes a connection to a terminal 93 at the output of a power switch 18. Power switch 18 receives the plus and minus 150 volt DC power from the power rails 20, 22 respectively of AC to DC converter and inverter circuit 16. As previously explained, these rails contain the main power source during normal utility supplied power operation and are driven in reverse through primary winding P and diodes 87, 88 during the course of auxiliary battery powered operation. The control input to power switch 18 is provided through at opto-isolator 96 by a TL 494 pulse width modulator circuit 94. While pulse width modulator circuit 94 is traditionally used for pulse width modulation control of regulated power supply circuits, it is used in this example to provide a nominal 65 percent duty cycle at 60 Hz to cause power switch 18 to supply terminal 93 with plus and minus 150 volt peak-to-peak quasi-square wave power signals at 60 Hz. This signal is sufficient to drive a connected video monitor or printer even though it is only an approximation of a 60 Hz AC sinusoidal utility power signal.

Figure 2:
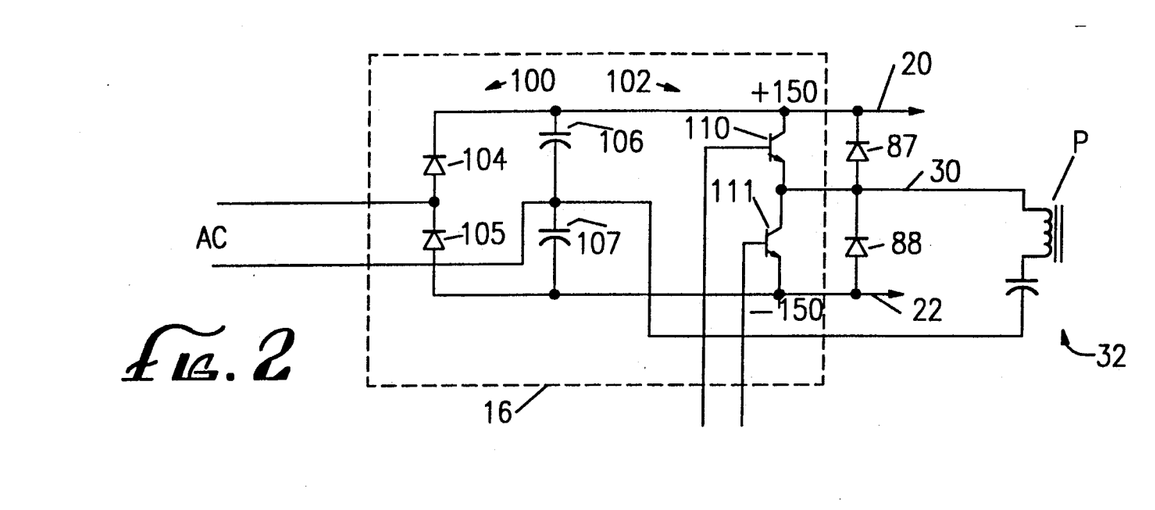
FIG. 2 is a simplified schematic representation of an AC to DC converter and inverter circuit used in the power supply shown in FIG. 1.

Referring now to FIG. 2, the AC to DC converter and inverter 16 is shown as including an AC to DC converter section 100 and an inverter section 102 responsive to control signals from the isolation transformer 34. Rectifying diodes 104, 105 charge the holding capacitors 106, 107 for DC voltage rails 20, 22 while transistors 110, 111 operate as inverters to selectively couple primary winding P to the high and low voltage rails 20, 22 respectively.

Figure 3:
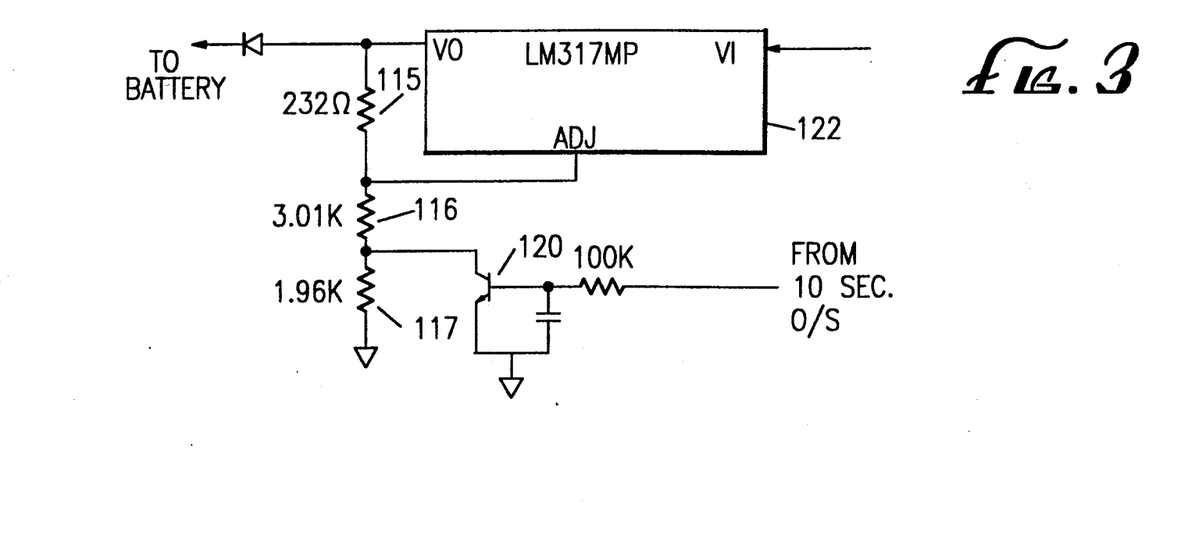
FIG. 3 is a schematic and block diagram representation of a charging circuit used in the power supply shown in FIG. 1.

The voltage regulator 68 is shown in somewhat greater detail in FIG. 3, to which reference is now made. The disabling of the voltage regulator is accomplished by connecting the ground input to a voltage divider circuit having 232 ohm, 3.01K and 1.96K resistors connected to between the output voltage and the ground. The adjustment terminal is connected between 232 ohm resistor 115 and 3.01K resistor 116. Upon activation of the output from 10 second one-shot 80 a transistor 120 is turned on to essentially short out resistor 1.96K resistor 117. This pulls the voltage of ground terminal of a LM 317 MP voltage regulator circuit 122 sufficiently low that the circuit 122 turns off and provides no further charging current to the batteries 64, 66.

Figure 4:
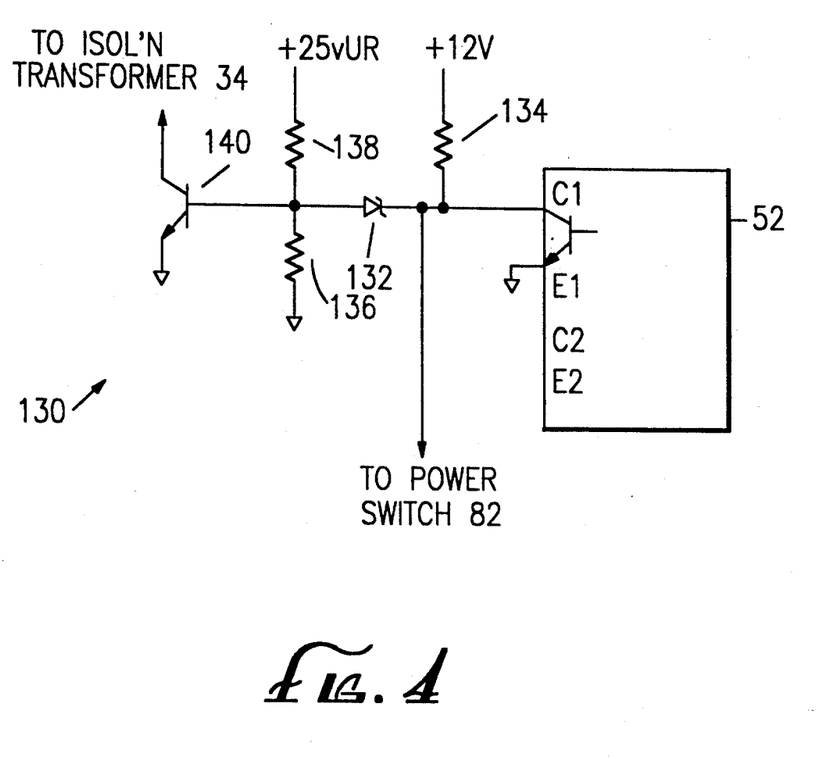
FIG. 4 is a block diagram and schematic representation of an isolation circuit in accordance with the invention.

Referring now to FIG. 4, there is shown an isolation circuit 130 which enables the pulse width modulator 52 to have open collector output C1 and C2 connected to isolation transformer 34 and power switch 82 by separate connections having different pull-up voltages. The C1 output is connected to a cathode of Schottky diode 132 and through a pull-up resistor 134 to 12 volts provided by voltage supply circuit 128. The anode of Schottky diode 132 is connected through voltage divider resistor 136 to ground, through voltage divide resistor 138 to 25 VUR and to the base of a transistor 140. Schottky diode 132 has a sufficiently low voltage drop that when output C1 turns on, transistor 140 turns off. The collector of transistor 140 thus represents a logical inversion of the output terminal C1. Voltage dividers 136,138 are selected to maintain transistor 140 biased on when output C1 presents a high impedance.

Although not separately shown, the C2 output is connected through an isolation circuit identical to isolation circuit 130 to isolation transformer 34 and power switch 82.

Figure 5:
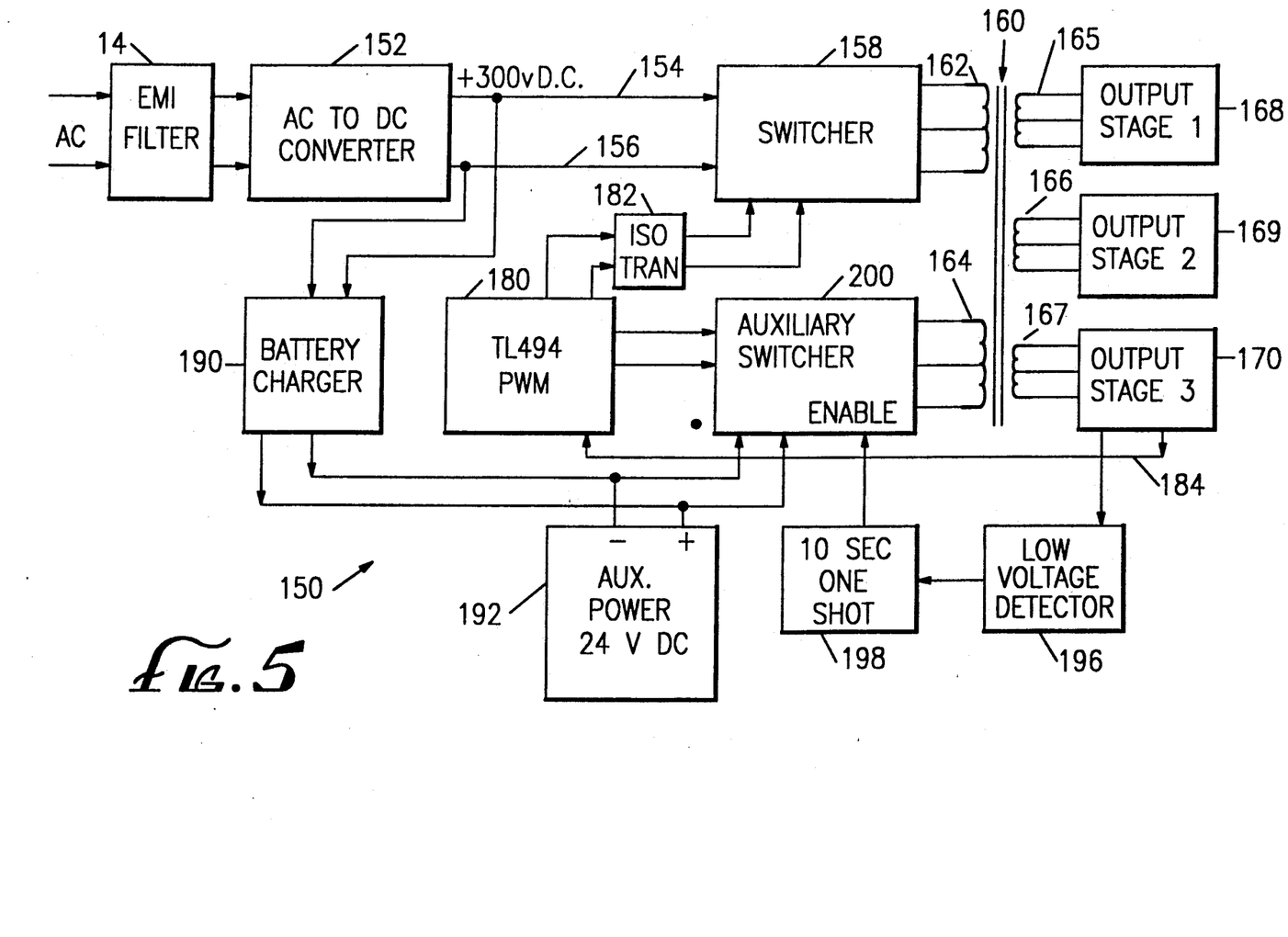
FIG. 5 is a block diagram representation of an alternative arrangement of a power supply in accordance with the invention having internal connection to an auxiliary power source.

An alternative arrangement of a regulated power supply 150 with an internally connected auxiliary power source is shown in FIG. 5, to which reference is now made. Power supply 150 includes an EMI filter 14 receiving AC utility electrical power and passing the received power to an AC to DC converter 152. After full wave rectification AC to DC converter 152 outputs 300 volt DC power on two DC power rails 154, 156 to a power switcher 158 which in turn energizes a transformer 160. Transformer 160 has a primary winding 162 coupled to receive switch power from the DC rails 154, 156 under control of switching signals from a pulse width modulation control circuit 180 after passage through isolation transformer circuit 182.

Transformer 160 further includes an auxiliary primary winding 164 and three secondary windings 165, 166, 167 coupled respectively to three output stages 168, 169 and 170. The output stages 168–170 include rectifier and filters selected to provide desired regulated output voltage.

Pulse width modulation circuit 180 receives a regulated output voltage from output stage three 170 of transformer 160 as a feedback signal 184 and pulse width modulates primary winding 162 so as to maintain a desired voltage on the feedback signal 184.

The DC voltage on DC power rails 154, 156 is coupled through a battery charger circuit 190 to a DC auxiliary power source 192 which might be a large capacitor, a nickel-cadmium battery or a lead acid battery similar to batteries 64, 66. The battery charger 190 may of course be omitted and must be disconnected if the auxiliary power source is not rechargeable.

As in the power supply 10, a low voltage detector 196 monitors the output voltage of one of the secondary windings such as winding 167 and actuates a 10 second one-shot 198 whenever the monitored voltage signal drops below a selected threshold. When activated by edge triggering, one-shot 198 generates an output signal that goes active for 10 seconds to enable an auxiliary switcher 200.

Switcher 200 receives DC power from auxiliary power supply 192 and also receives essentially the same pulse width modulated timing control signals from pulse width modulation circuit 180 as switcher 158. When enabled, switcher 200 drives auxiliary transformer primary winding 164 with energy from auxiliary power source 192. At the end of 10 seconds switcher 200 is disabled. If AC power has not returned, the feedback voltage signal 184 decreases in value until one-shot 198 is again fired to initiate another 10 second cycle of auxiliary power.

The operation of power supply 150 is thus similar to the operation of power supply 10 except that the auxiliary power source 192 is charged in response to the DC power rails 154, 156 and auxiliary power is communicated to the transformer 160 through an auxiliary primary winding 164 rather than through a secondary winding which provides a regulated output voltage.

While there have been shown and described various arrangements of device power supplies with internal connection to an auxiliary power source for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. An uninterruptible power supply comprising:
   an AC to DC converter providing DC electrical power in response to AC electrical power;
   a charging circuit coupled to derive electrical energy from the DC electrical power provided by the converter and provide charging current to an energy store;
   an output circuit coupled to receive electrical energy from the converter when energy is available therefrom and to receive electrical energy from the energy store when electrical energy is not available from the converter, the output circuit providing at least two electrical outputs, each being separately coupled to receive energy from the AC to DC converter and each having an output signal with a predetermined characteristic with at least one of the at least two electrical output signals being a regulated DC voltage output signal and with each of the two electrical outputs receiving energy from the same energy store when energy is not available from the converter, the charging circuit being connected to receive electrical energy from an output signal from the output circuit to provide the charging current.

2. An uninterruptible power supply according to claim 1 further comprising said energy store coupled to receive electrical energy from the charging circuit and provide electrical energy to the output circuit when energy is not available from the converter.

3. An uninterruptible power supply according to claim 2 wherein the energy store is a battery.

4. An uninterruptible power supply using a battery as an auxiliary power source, the power supply comprising;
   a converter which receives AC electrical energy from a source and outputs DC electrical energy in response thereto;
   an output circuit coupled to receive DC electrical energy from the converter when available and from the battery when not available from the converter, the output circuit providing at least one regulated direct current output voltage;
   a charging circuit which receives electrical energy from the output circuit and provides charging energy to the battery in response thereto;
   a detector coupled to the output circuit to detect a loss of power at the output circuit and generate a detector signal indicative of the availability of energy at the output circuit;
   a first switch coupled to receive DC electrical energy from the converter and couple the received DC electrical energy to the output circuit when energy is available from the AC electrical energy source; and
   a second switch coupled to receive energy from the battery and couple the received energy to the output circuit when the detector signal indicates that energy is not available from the AC electrical energy source.

5. An uninterruptible power supply using a battery as an auxiliary power source, the power supply comprising:
   a converter which receives AC electrical energy and outputs DC electrical energy in response thereto;

an output circuit coupled to receive DC electrical energy from the converter when available and from the battery when not available from the converter, the output circuit providing at least one regulated output voltage in response to the received electrical energy; and a charging circuit coupled to receive DC electrical energy from the output circuit and provide charging energy to the battery in response thereto.

6. An uninterruptible power supply using a battery as an auxiliary power source, the power supply comprising:

a converter which receives AC electrical energy and outputs DC electrical energy in response thereto;

an output circuit coupled to receive electrical energy from the converter when available and from the battery when not available from the converter, the output circuit providing at least a first and a second regulated output voltage in response to the received electrical energy;

a detector coupled to the output circuit to detect a loss of power at the output circuit and generate in response thereto a detector signal indicative of the loss of power; and a charging circuit coupled to receive electrical energy from the output circuit and the detector signal and provide charging energy to the battery, the providing of charging energy to the battery being inhibited when the detector signal indicates a loss of pweor at the output circuit.

7. A power supply comprising:

an AC to DC converter providing DC electrical energy in response to receipt of AC electrical energy;

a first switching circuit coupled to receive the DC electrical energy from the converter and output electrical energy of continually inverting polarity in response thereto;

a transformer circuit having a primary winding and at least two secondary windings providing electrical energy having a selected voltage, the primary winding being coupled to receive electrical energy from the first switching circuit;

at least one output circuit coupled respectively to at least one of the two secondary windings, each output circuit providing a regulated DC output voltage of selected magnitude in response to electrical energy received from said coupled secondary winding;

a charging circuit coupled to receive DC electrical energy from one of the secondary windings and provide charging energy to an electrical energy store in response thereto; and a second switching circuit coupled to receive electrical energy from the electrical energy store and provide electrical energy to the one transformer circuit secondary winding to which the charging circuit is coupled when energy is not available from the converter.

8. A power supply according to claim 7 further comprising the electrical energy store coupled to receive electrical energy from the charging circuit and provide energy to the second switching circuit when energy is not available from the converter.

9. A power supply comprising:

a converter circuit receiving AC electrical energy and providing DC electrical energy in response thereto;

a first switching circuit receiving the DC electrical energy from the converter circuit and providing continually inverting electrical energy in response thereto;

a transformer circuit having a primary winding coupled to receive the continually inverting electrical energy from the first switching circuit and a plurality of secondary windings providing continuously inverting electrical signals having a selected voltage;

at least one output circuit coupled to receive electrical energy from one of the secondary windings and provide as an output in response thereto a regulated DC voltage;

a second switching circuit coupled to provide continually inverting electrical energy to one of the secondary windings when electrical energy is not available from the converter in response to electrical energy received from an electrical energy store; and a charging circuit coupled to provide charging energy to the electrical energy store in response to electrical energy received from a secondary winding of the transformer while electrical energy is available from the converter circuit.

10. A power supply according to claim 9 further comprising said electrical energy store coupled to receive electrical energy from the charging circuit and provide electrical energy to the second switching circuit when energy is not available from the converter.

11. A power supply according to claim 10 wherein the electrical energy store is a battery.

12. A power supply according to claim 10 wherein the electrical energy store is a capacitor.

13. A power supply comprising:

an AC to DC converter coupled to receive an AC power signal and generate a DC power signal in response thereto;

a transformer circuit having a primary winding and a secondary winding;

an output circuit coupled to receive electrical energy from the secondary winding and generate a regulated DC output voltage signal in response thereto;

a switch coupled to control application of power from the DC power signal to the primary winding in response to switch control signals;

a pulse width modulation control circuit coupled to receive a reference voltage signal from the secondary winding and to provide to the switch said switch control signals with a duty cycle selected to maintain the received reference voltage signal qt a selected magnitude;

an auxiliary power source; and an auxiliary switch coupled to receive the switch control signals from the pulse width modulation control circuit and supply power to the secondary winding of the transformer circuit from the auxiliary power source in response to the switch control signals when insufficient power is available from the AC to DC converter to maintain the reference voltage signal.

14. A power supply according to claim 13 further comprising a one-shot circuit coupled to enable operation of the auxiliary switch for a fixed period of time when insufficient energy is available to maintain the reference voltage from the secondary winding at a magnitude of at least the selected magnitude.

15. A power supply according to claim 13 further comprising:
- a detector circuit coupled to detect the reference voltage signal from the secondary winding and to command the auxiliary switch to supply power to the secondary winding of the transformer circuit for a predetermined period of time when the reference voltage is less than a selected magnitude; and
- a charging circuit coupled to receive energy from the secondary winding of the transformer and charge the auxiliary power source.

16. A power supply according to claim 13 wherein the power supply further includes a detector coupled to detect a loss of power at the secondary winding and to command the auxiliary switch to supply power to the secondary winding of the transformer for a predetermined period of time when insufficient power is available from the AC to DC converter to maintain the reference voltage signal.

17. A power supply comprising:
- an AC to DC converter circuit coupled to receive AC electrical power and output DC electrical power signal at a first voltage in response thereto;
- an auxiliary power source providing an auxiliary DC power signal at a voltage less than half the voltage of the output DC electrical power signal;
- an output circuit providing at least one output signal having a selected characteristic;
- a switch coupled to control a transfer of energy from the output DC electrical power signal to the output circuit to maintain the selected characteristic of the output signal when AC electrical power is available; and
- an auxiliary switch coupled to transfer energy from the auxiliary power source to the output circuit whenever the AC to DC converter is unable to meet the energy requirements of the output circuit.

18. A power supply comprising:
- an output circuit coupled to receive electrical energy and generate an output signal having a regulated DC voltage in response thereto;
- a regulating circuit coupled to control the energy provided to the output circuit in response to the output signal;
- a circuit coupled to receive AC power and supply power to the regulating circuit in response thereto;
- an auxiliary power source;
- a detector circuit coupled to detect a status of the output signal and generate an auxiliary power command signal in response thereto; and
- a one-shot circuit coupled to enable a coupling of power from the auxiliary power source to regulating circuit for a predetermined period of time in response to generation of the auxiliary power command signal.

19. A power supply according to claim 18 further comprising an auxiliary power output circuit coupled to receive power from the output circuit and generate AC power in response thereto.

* * * * *

UNITED STATES PATENT AND TRADEMARK OFFICE
CERTIFICATE OF CORRECTION

PATENT NO. : 5,289,045

DATED : February 22, 1994

INVENTOR(S) : James Vincent Lavin et al.

It is certified that error appears in the above-identified patent and that said Letters Patent is hereby corrected as shown below:

On title page, item [57]
In ABSTRACT, line 2, change "power to" to read

- - "power source to" - -

In Claim 6, column 9, line 30, change "pweor" to read

- - "power" - -

In Claim 13, column 10, line 52, change "qt" to read

- - "at" - -

Signed and Sealed this

Sixteenth Day of August, 1994

Attest:

BRUCE LEHMAN

Attesting Officer    Commissioner of Patents and Trademarks